J. H. THOMAS.
AUTOMOBILE COMBINATION JACK.
APPLICATION FILED FEB. 8, 1921.
1,414,903.
Patented May 2, 1922.
4 SHEETS—SHEET 4.
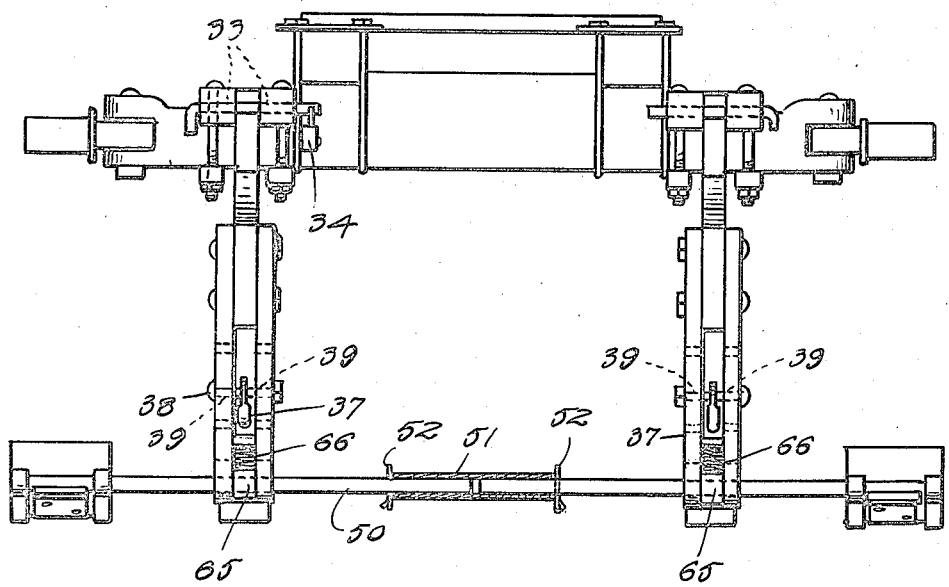
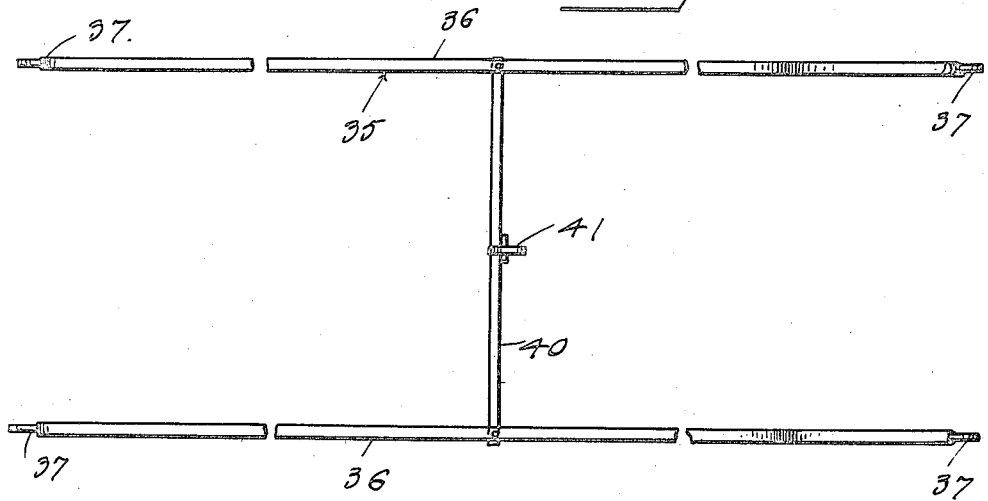
Inventor
J. H. Thomas

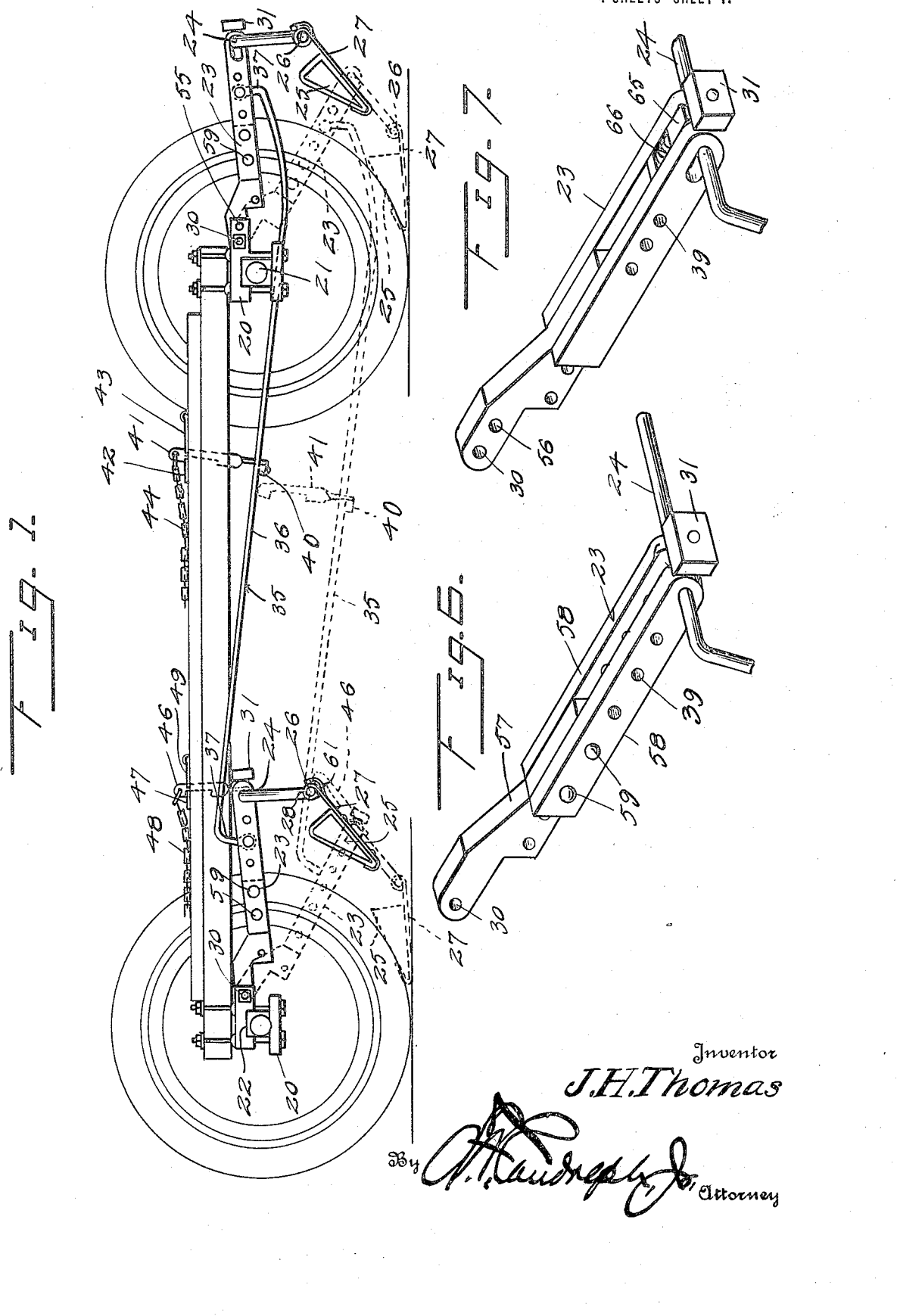

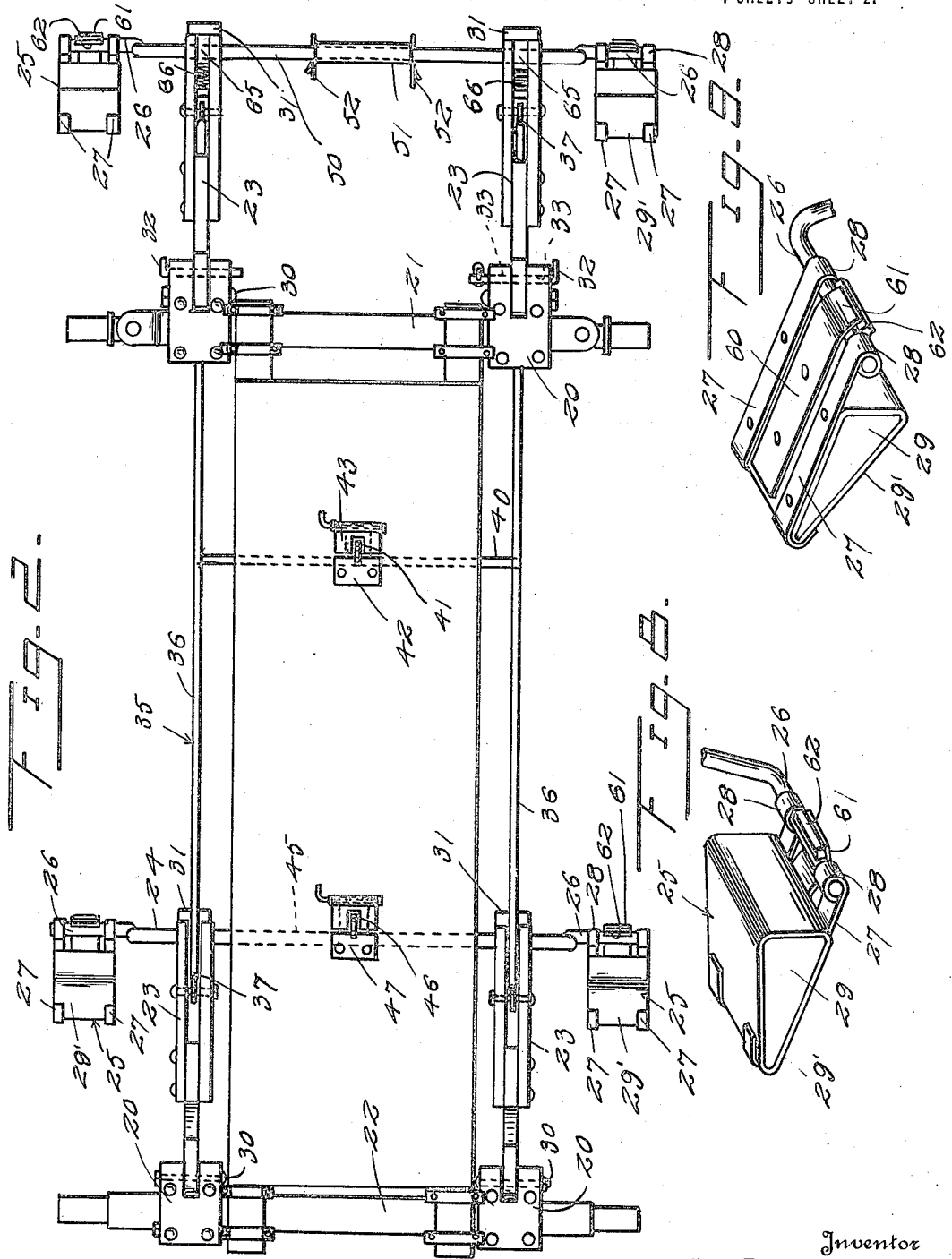

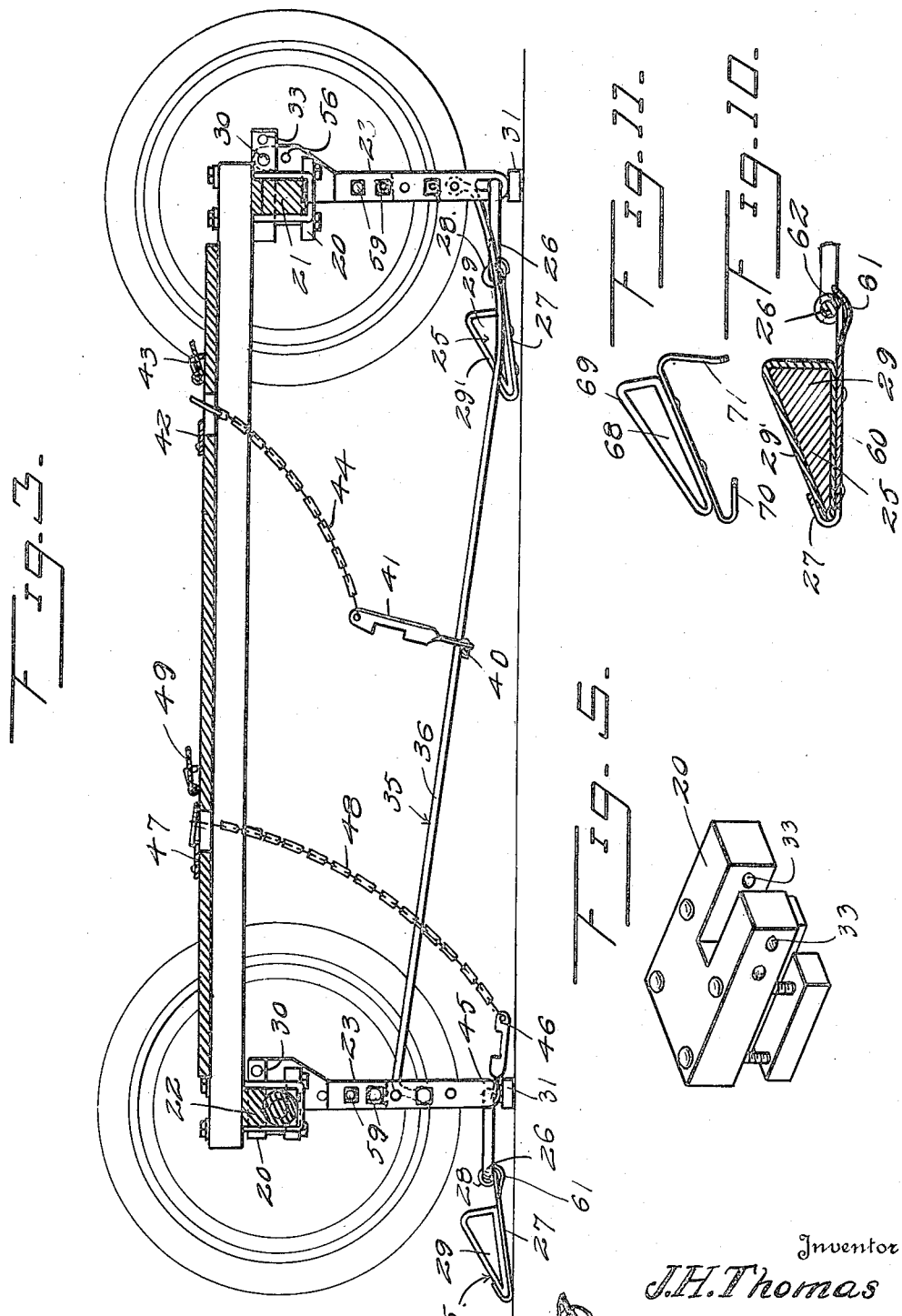

UNITED STATES PATENT OFFICE.

JAMES H. THOMAS, OF LOS ANGELES, CALIFORNIA.

AUTOMOBILE COMBINATION JACK.

1,414,903.  Specification of Letters Patent.  Patented May 2, 1922.

Application filed February 8, 1921. Serial No. 443,356.

*To all whom it may concern:*

Be it known that I, JAMES H. THOMAS, a citizen of the United States, residing at Los Angeles, in the county of Los Angeles and State of California, have invented certain new and useful Improvements in an Automobile Combination Jack; and I do hereby declare the following to be a full, clear, and exact description of the invention, such as will enable others skilled in the art to which it appertains to make and use the same.

The object of the invention is to provide an automobile jack which can be employed as a permanent part of the equipment of a car for use not only in raising the wheels singly and in pairs or groups for the purpose of making repairs, replacing tires and the like but for supporting the machine to relieve the tires of the weight thereof when in the shop or garage or from season to season when the car is not in use, and furthermore to provide a device for the purposes indicated which will also serve as a fender for the front end of the car and which will have individual wheel guards serving as means to minimize the risk of serious accidents upon encountering obstacles such as other vehicles or pedestrians; and with these objects in view the invention consists in a construction, combination and relation of parts of which a preferred embodiment is shown in the accompanying drawing wherein:

Figure 1 is a side view of a jack embodying the invention applied in the operative position to a typical form of vehicle.

Figure 2 is a plan view of the same.

Figure 3 is a longitudinal sectional view showing the jack in its operative position with the car elevated.

Figure 4 is a front view.

Figure 5 is a detail view in perspective of one of the axle engaging clips.

Figure 6 is a similar view of one of the bracket arms.

Figure 7 is a view of a slightly modified construction of bracket arm.

Figures 8 and 9 are detail perspective views of one of the jack shoes, showing opposite sides thereof in connection with the crank arms by which it is carried.

Figure 10 is a detail longitudinal sectional view of the jack shoe and mounting.

Figure 11 is a detail view of the emergency shoe.

Figure 12 is a detail view of the coupling frame by which the front and rear pairs of bracket arms are connected.

Pivotally connected with clips 20 which are engaged with the front and rear axle housings 21 and 22 are the forwardly extending bracket arms 23 from the free ends of which depend the crank arms 24 carrying the jack shoes 25, swiveled for swinging movement upon the spindle portions 26 of the crank arms by means of side arms 27 having terminal eyes 28,—the block 29 of each shoe being of beveled form, or tapered toward its rear edge and preferably provided with a covering or clothing 29' of leather or like material to avoid chaffing the tires of the wheels as they pass thereover when the shoes are lowered by the swinging movement of the bracket arms to occupy a position in advance thereof as shown by dotted lines in Figure 1.

As the bracket arms are lowered to position the shoes, such movement being in relation to the pivots 30 by which said arms are mounted upon the clips, the crank arms which are respectively rigid with the bracket arms, or in other words maintain a fixed angular relation therewith, serve to move the shoes in a downward and rearward direction to locate the reduced edges thereof under and in advance of the tread portions of the wheel tires, so that the turning of the wheels either by hand or otherwise serves to cause them to mount the blocks and pass thereover, and in so doing swing the bracket arms to and slightly beyond an upright position to enable them to rest upon the feet 31 which are located at the forward ends of the bracket arms and which thus constitute a base upon which the jack with its load is supported. To lock the car in the elevated position, in which the tires are entirely relieved of the pressure due to the weight of the car, a locking pin 32 may be engaged with registering openings 33 in one of the forward axle clips in advance of the adjacent portion of the bracket arm, and if as indicated in Figure 4 said locking pin is provided with a padlock connection 34, it will serve not only as a means of preventing the car from accidentally dropping to its normal position but will prevent the surreptitious or unauthorized removal of the car and may be utilized as a means of securing the car when parked upon the road or street. Obviously the desired object so far as preventing surreptitious removal of the car could be secured merely by jacking up the front wheels in which event the coupling frame 35 which is shown in the drawing to connect the front and rear pairs of bracket arms would not be required. The purpose of this frame is to enable the jack shoes of both the front and rear wheels to be positioned simultaneously when it is desired to raise the machine bodily to relieve all of the wheel tires of pressure, and in the construction illustrated said coupling frame, consists of the side rods 36 provided at their front and rear ends with perpendicular fingers 37 engaged by bolts 38 fitted in openings 39 in the bracket arms which, as shown in detail in Figure 6, may be slotted or bifurcated to receive said fingers. The side rods of the coupling frame are connected intermediately by a cross bar 40 with which is connected a latch 41 adapted when the shoes are elevated to be engaged with a catch 42 on the floor or other convenient portion of the vehicle where it may be secured by means of a pivotal retainer 43. A chain 44 or like device connected with the latch may serve as a means of raising the shoes and their supporting means to the folded or inoperative position indicated in full lines in Figure 1. Also in order to provide for the raising and securing of the rear shoes in the event that the coupling frame is not employed, or in the event that the front and rear pairs of shoe supporting bracket arms are not connected for joint actuation, a coupling rod 45 may connect the free ends of the rear bracket arms, said rod being as illustrated formed as a part of the crank arms and having connected therewith a latch 46 for engagement with a catch 47 and having an operating chain 48, a retainer 49 being employed to secure said latch in its engaging position.

It is also contemplated that it may be desirable in some instances to raise only one wheel of the car as for instance when it is desired to replace a tire or make a similar repair to one wheel, and to this end a connecting rod 50 which is arranged transversely between the bracket arms of the front axle is constructed in sections united by a sleeve 51 held in place for example by a key 52, upon the removal of which the sleeve may be moved to permit of independent operation of the bracket arms. As a further and supplemental means of holding the front bracket arms in their substantially horizontal or inoperative positions keys 55 may be arranged in the transverse openings of the front axle clips to engage openings 56 in said arms, and with the form of arm illustrated in detatil in Figure 6 an adjustment is possible to suit the diameter of the wheels of the vehicle by constructing the same of a pivot member 57 and side arms 58 secured to the pivot member by transverse bolts 59 engaging series of transverse openings in said pivot member and arms and selectively engageable by said bolts to vary the effective length of the bracket arm. A similar adjustment of the terminals of the coupling frame with relation to the bracket arms may be effected by reason of the openings provided in the bracket arms for engagement by the bolts which secure the ends of the coupling frame rods thereto. In the modified construction of bracket arm illustrated in Figure 7, the feature of the adjustment to suit different diameters of wheels is omitted.

In order that the jack shoes may be adapted to be positioned in proper relation respectively to the wheels of the car as the bracket arms are lowered and may at the same time yield to the movement of the wheels, and in order that the crank arms may swing in relation to the shoes as the car is advanced over the blocks or shoes to dispose the bracket arms in the upright or car supporting position, the said shoes as above described are provided with side arms swiveled upon the spindle portions of the crank arm, but in order that the shoes may be held in a rearwardly and downwardly inclined position when the bracket arms are elevated, so that they may properly be positioned under the wheels when the bracket arms are lowered, there is employed in connection with each shoe a plate spring 60 having a cam faced free end 61 to ride upon a rib 62 carried by the spindle portion of the crank arm, and thus while permitting a swinging movement of the shoe forwardly at its lower end, under strain, acts to yieldingly hold the shoe in the position indicated in full lines in Figure 1 where it serves as a fender for the wheel to minimize the possibility of any object encountered by the wheel being caught in such a way as to cause the wheel to pass thereover.

Moreover the connecting rod disposed transversely between the bracket arms of the front axle serves as a fender and for that reason is preferably disposed in carrier bearings 65 which are yieldingly held advanced by the springs 66 which however cushion the bar or rod in the event of contact thereof with an opposing object. Obviously any other suitable means of cushioning the said rod to adapt it to efficiently perform the function of a fender, may be employed or substituted for that indicated.

It will be further understood that the rear connecting rod between the bracket arms which are mounted upon the rear axle may be divided as described in connection with the front connecting rod to permit of the jacking up of a single rear wheel when desired.

Thus while the device suggested is adapted to be used in emergency cases to jack up one or more of the wheels to permit of making repairs or readjustment, it is also adapted to provide for jacking up the car to relieve the tires, particularly in hot weather to serve as a means of saving the same by avoiding the strain thereon when not required and which, as is generally recognized, is a prolific source of deterioration of tires of the inflatable type, and furthermore the device being permanently mounted upon the car is always ready for operation and when not in use as a jack serves as an efficient form of fender to minimize the risk of disastrous collisions with opposing objects and particularly the risk of running over a pedestrian who may be in the path of the car, owing to the action of the jack shoes as individual fenders for the wheels; and when the coupling frame is in use as shown in Figures 1 to 3 inclusive, both sets of shoe carrying arms may be manipulated at the same time either to jack up the car or to return the same to their normal positions.

When it is desired to jack up a car or one end of a car when the tire of one of the wheels is flat or deflated, an emergency shoe shown in detail in Figure 11 may be employed, said shoe having a tapered block 68 having a suitable covering or clothing 69 and yielding or spring clip arms 70 and 71 for engaging opposite ends of one of the jack shoes. The emergency shoe may be slipped upon either of the jack shoes from the side, and after the car or one end thereof has been elevated, said emergency shoe may be removed to give free access to the tire.

Having thus described the invention, what I claim is:—

1. A vehicle jack having bracket arms mounted to swing parallel with the planes of the wheels, crank arms journaled on said bracket arms, shoes pivoted to the crank arms for arrangement in the paths of the wheels disposed beyond a vertical line passing through the wheel axis when the wheel is raised, and means to normally maintain the bracket arms in an elevated position.

2. A vehicle jack having bracket arms mounted to swing parallel with the planes of the wheels, crank arms journaled on said bracket arms, shoes pivoted to the crank arms for arrangement in the path of the wheels and disposed beyond a vertical line passing through the wheel axis when the wheel is raised, the crank arms having transverse spindle portions, said shoes having eyes revolubly mounted by said portions, and means to normally maintain the bracket arms in an elevated position.

3. A vehicle jack having bracket arms to swing parallel with the planes of the wheels, crank arms journaled on said bracket arms, shoes pivoted to the crank arms for arrangement in the path of the wheels and disposable beyond a vertical line passing through the wheel axis when the wheel is raised, means to hold the shoes yieldingly in operative relation to the crank arms and bracket arms yieldable to facilitate disposition of the shoes relatively to the wheels, and means to normally maintain the bracket arms in their elevated position.

4. A vehicle jack having bracket arms to swing parallel with the planes of the wheel, crank arms journaled on said bracket arms, shoes swiveled to the bracket arms for arrangement in the path of the wheels and disposable beyond a vertical line passing through the wheel axis when the wheel is raised, means to hold the shoes in a downwardly and rearwardly inclined position for yielding movement relatively to the wheels, and means to normally maintain the bracket arms in elevated position.

5. A vehicle jack having bracket arms for swinging movement parallel with the planes of the wheels and provided with depending crank arms and terminal feet, and shoes having a swivel connection with the arms for arrangement in the path of the wheels, said crank arms having spindle portions upon which the shoes are mounted, and the latter being provided with springs having cam faces for engaging ribs on the spindles.

6. A vehicle jack having bracket arms for swinging movement parallel with the planes of the wheels and carrying shoes having wedge shaped blocks for arrangement in the paths of the wheels, axle engaging clips being employed to pivotally support the bracket arms, and means for securing the arms in fixed relation with said clips.

7. A vehicle jack having bracket arms for swinging movement parallel with the planes of the wheels and carrying shoes having wedge shaped blocks for arrangement in the paths of the wheels, means for securing said arms in their forwardly extended and upright positions and a fender bar connecting the forward ends of the front bracket arms.

8. A vehicle jack having bracket arms for swinging movement parallel with the planes of the wheels and carrying shoes having wedge shaped blocks for arrangement in the paths of the wheels, means for securing said arms in their forwardly extended and upright positions and a fender bar connecting the forward ends of the front bracket arms, said fender bar being cushioned to yieldingly resist rearward displacement.

9. A vehicle jack having bracket arms for swinging movement parallel with the planes of the wheels and carrying shoes having wedge shaped blocks for arrangement in the paths of the wheels, a fender bar transversely connecting the front bracket arms and consisting of sections respectively carried by said bracket arms and means for securing said sections in alignment.

10. A vehicle jack having bracket arms for swinging movement parallel with the planes of the wheels and carrying shoes having wedge shaped blocks for arrangement in the paths of the wheels, a fender bar transversely connecting the front bracket arms and consisting of sections respectively carried by said bracket arms and means for securing said sections in alignment, and consisting of a sleeve arranged in telescoping relation with said sections.

In testimony whereof I affix my signature in presence of two witnesses.

JAMES H. THOMAS.

Witnesses:
ARTHUR M. ORR,
LELAND MANN.